United States Patent
Kojima et al.

(10) Patent No.: US 10,899,145 B2
(45) Date of Patent: Jan. 26, 2021

(54) IMAGE FORMING METHOD, IMAGE FORMING APPARATUS, AND SET OF INK AND PROCESSING FLUID

(71) Applicants: Sayuri Kojima, Kanagawa (JP); Takashi Tamai, Kanagawa (JP); Atsufumi Hanazawa, Tokyo (JP)

(72) Inventors: Sayuri Kojima, Kanagawa (JP); Takashi Tamai, Kanagawa (JP); Atsufumi Hanazawa, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/687,866

(22) Filed: Nov. 19, 2019

(65) Prior Publication Data
US 2020/0156389 A1 May 21, 2020

(30) Foreign Application Priority Data
Nov. 19, 2018 (JP) .................. 2018-216114

(51) Int. Cl.
*B41J 11/00* (2006.01)
*B41J 11/04* (2006.01)
(Continued)

(52) U.S. Cl.
CPC ............ *B41J 11/002* (2013.01); *B41J 2/005* (2013.01); *B41J 2/2114* (2013.01); *B41J 11/0015* (2013.01); *B41J 11/04* (2013.01); *B41J 11/54* (2013.01); *B41M 5/0011* (2013.01); *B41M 5/0017* (2013.01); *C09D 11/322* (2013.01); *B41J 2002/0055* (2013.01)

(58) Field of Classification Search
CPC ...... B41J 2/005; B41J 2/2114; B41J 11/0015; B41J 11/002; B41J 11/04; B41J 11/54; B41J 2002/0055; B41M 5/0011; B41M 5/0017; C09D 11/322
See application file for complete search history.

(56) References Cited

U.S. PATENT DOCUMENTS

2011/0216123 A1  9/2011  Tamai et al.
2011/0310166 A1  12/2011  Namba et al.
(Continued)

FOREIGN PATENT DOCUMENTS

JP  2002-121438  4/2002
JP  2017-136848  8/2017

*Primary Examiner* — Anh T Vo
(74) *Attorney, Agent, or Firm* — Oblon, McClelland, Maier & Neustadt, L.L.P.

(57) ABSTRACT

An image forming method includes applying a processing fluid to a recording medium, applying an ink to the recording medium onto which the processing fluid has been applied, and heating the recording medium onto which the ink has been applied, wherein the ink comprises a black ink and at least one color ink other than the black ink, wherein the following relationship is satisfied: $|\gamma(k)-\gamma(c)|\leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms, wherein the ink discharged from an extreme downstream nozzle in a direction of recording medium conveyance is heated at 1.5 seconds or less after the ink is attached to the recording medium.

18 Claims, 6 Drawing Sheets

(51) Int. Cl.
*B41J 2/005* (2006.01)
*B41M 5/00* (2006.01)
*C09D 11/322* (2014.01)
*B41J 2/21* (2006.01)
*B41J 11/54* (2006.01)

(56) References Cited

U.S. PATENT DOCUMENTS

| | | |
|---|---|---|
| 2012/0236066 A1 | 9/2012 | Tamai et al. |
| 2013/0194345 A1 | 8/2013 | Tamai et al. |
| 2013/0307912 A1* | 11/2013 | Masuda ................ C09D 11/40 347/100 |
| 2014/0253618 A1 | 9/2014 | Masuda et al. |
| 2015/0258796 A1 | 9/2015 | Tamai et al. |
| 2015/0259567 A1 | 9/2015 | Tamai et al. |
| 2016/0024323 A1 | 1/2016 | Tamai et al. |
| 2016/0137862 A1 | 5/2016 | Tamai et al. |
| 2016/0144620 A1 | 5/2016 | Masuda et al. |
| 2016/0160161 A1 | 6/2016 | Tamai et al. |
| 2016/0185110 A1 | 6/2016 | Masuda et al. |
| 2016/0264807 A1* | 9/2016 | Sagara ................ C09D 11/102 |
| 2017/0015102 A1 | 1/2017 | Nagashima et al. |
| 2018/0094152 A1 | 4/2018 | Sakaguchi et al. |
| 2018/0126728 A1 | 5/2018 | Saito et al. |
| 2018/0126731 A1* | 5/2018 | Ishikawa ................ B41J 2/1433 |
| 2018/0244935 A1 | 8/2018 | Sakaguchi et al. |
| 2019/0118557 A1 | 4/2019 | Harada et al. |
| 2019/0284412 A1 | 9/2019 | Maekawa et al. |

* cited by examiner

IMAGE FORMING METHOD, IMAGE FORMING APPARATUS, AND SET OF INK AND PROCESSING FLUID

CROSS-REFERENCE TO RELATED APPLICATIONS

This patent application is based on and claims priority pursuant to 35 U.S.C. § 119 to Japanese Patent Application No. 2018-216114, filed on Nov. 19, 2018, in the Japan Patent Office, the entire disclosure of which is hereby incorporated by reference herein.

BACKGROUND

Technical Field

The present invention relates to an image forming method, an image forming apparatus, and a set of ink and processing fluid.

Description of the Related Art

Inkjet recording methods are known which use processing fluid capable of aggregating a coloring material in ink.

For example, beading caused by unification of adjacent dots, which easily occurs to a recording medium having a low-absorbability such as surface-coated board paper in which recycled paper pulp for use in coated paper, package, etc., for use in commercial printing is mixed in an intermediate layer and a rear layer, can be reduced if a processing fluid capable of aggregating a coloring material is preliminarily applied to the recording medium.

The type, amount, and properties of a flocculant contained in the processing fluid is not particularly limited and can be suitably selected depending on the polarity and dispersion method of a coloring material in ink. For example, when a pigment as the coloring material is dispersed by an anionic water-soluble resin, a cationic polymer, a cationic particle, an organic acid, or a multivalent metal salt is used as a flocculant.

However, if the aggregation reaction of a flocculant is too quick, the processing fluid aggregates the ink before the ink permeates the surface of a recording medium and spreads thereon so that the ink dot diameter may not expand. Therefore, although beading ascribable to moving of the ink after the ink lands on the recording medium can be effectively reduced, image density or saturation may deteriorate to the contrary. Conversely, if the aggregation reaction of a flocculant is too slow, for a recording medium without a surface coated layer such as plain paper, ink permeates the inside of the recording medium, resulting in poor coloring and occurrence of beading.

To solve this issue, as a method of enhancing drying property of ink and reducing color bleed and beading, for example, a method of adjusting the drying time of processing fluid and ink on plain paper and the surface tension has been proposed.

In addition, another method has been proposed which includes discharging an aqueous ink containing a pigment onto a recording medium from a line head employing an inkjet method to record an image on the recording medium and humidifying the portion between the discharging port of the line head and the recording medium, wherein the aqueous ink contains black ink and a color ink and the dynamic surface tension of the black ink at a lifetime of 10 ms is larger than the dynamic surface tension of the color ink at a lifetime time of 10 ms.

SUMMARY

According to embodiments of the present disclosure, provided is an image forming method which includes applying a processing fluid to a recording medium, applying an ink to the recording medium onto which the processing fluid has been applied, and heating the recording medium onto which the ink has been applied, wherein the ink comprises a black ink and at least one color ink other than the black ink, wherein the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms, wherein the ink discharged from an extreme downstream nozzle in a direction of recording medium conveyance is heated at 1.5 seconds or less after the ink is attached to the recording medium.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
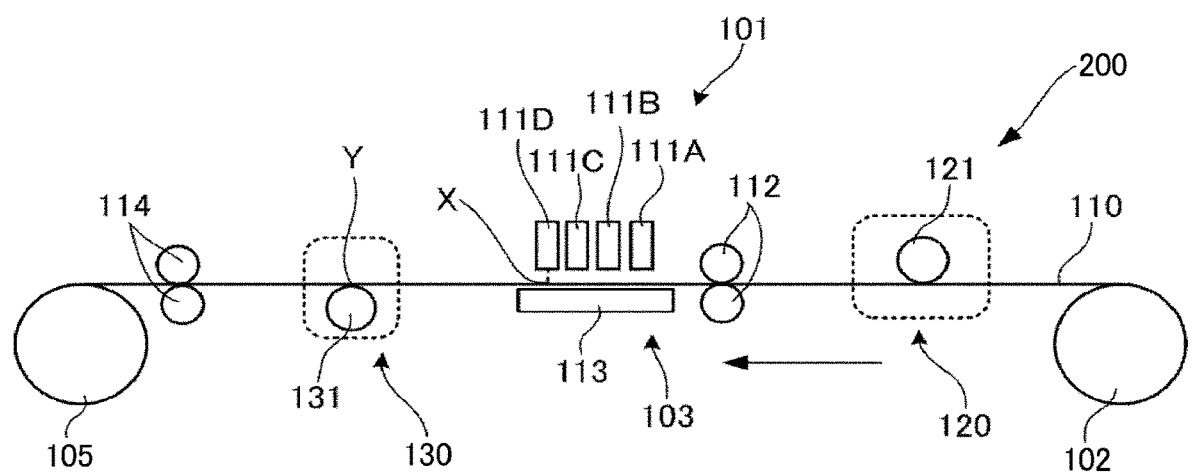
FIG. 1 is a schematic diagram illustrating an example of the image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, it is possible to provide an image forming method by which color bleed never or little occurs when forming a color image and the gamut coverage does not decrease even after application of a processing fluid.

Image Forming Method and Image Forming Apparatus

The image forming method of the present disclosure includes applying a processing fluid to a recording medium, applying an ink to the recording medium onto which the processing fluid has been applied, and heating the recording medium onto which the ink has been applied, wherein the ink contains a black ink and at least one color ink other than the black ink, wherein the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms, wherein the ink discharged from the extreme downstream nozzle in the direction of recording medium conveyance is heated within 1.5 seconds of when the ink is attached onto the recording medium.

The image forming apparatus of the present disclosure includes a processing fluid application device configured to apply a processing fluid to a recording medium, an ink application device including nozzles including a extreme downstream nozzle in the direction of recording medium conveyance, the ink application device being configured to apply an ink to the recording medium onto which the processing fluid has been applied, and a heating device configured to heat the recording medium onto which the processing fluid has been applied, wherein the ink contains a black ink and at least one color ink other than the black ink, wherein the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms, wherein the time taken for the recording medium onto which the ink has been applied to pass through the vicinity of the heating device or the position in contact with the heating device is 1.5 seconds or less after the ink discharged from the extreme downstream nozzle is attached to the recording medium.

By the technology disclosed in JP-2002-121438-A1 mentioned above, it is difficult to completely reduce bleeding between ink dots adjacent to each other after the ink dots have landed on the recording medium because the time taken for the ink discharged from the extreme downstream nozzle in the direction of recording medium conveyance to be heated after the ink has landed on the recording medium is not controlled. In addition, the gamut coverage decreases since the deterioration of coloring ascribable to application of processing fluid is not considered.

In the technology disclosed in JP-2017-136848-A1 mentioned above, a particular surface tension between inks is not defined and the time taken for the ink discharged from the extreme downstream nozzle in the direction of recording medium conveyance to be heated after the ink has landed on the recording medium is not controlled. As a result, it is not possible to reduce bleeding between printing colors when forming a color image and prevent a decrease in the gamut coverage after the processing fluid is applied.

As a result of the intensive investigation on the conditions of improving color bleed while securing wettability of ink in order not to degrade the gamut coverage after a processing fluid is applied, the present inventors have found that, it is possible to reduce deterioration of the gamut coverage after the processing fluid is applied and diminish color bleed by using black ink and at least one type of color ink other than the black ink while the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms, wherein the ink discharged from the extreme downstream nozzle in the direction of recording medium conveyance is heated is set at 1.5 seconds or less after the ink is attached onto the recording medium.

Usually, when the difference of the dynamic surface tension between black ink and at least one color ink other than the black ink is small, the solvent in the ink discharged from an extreme downstream nozzle in the direction of recording medium conveyance evaporates due to the time difference of the ink attachment to the recording medium, which causes the difference of the dynamic surface tension between the inks when the ink is attached to the recording medium, so that color bleed occurs. In the present disclosure, when the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of at least one color ink other than the black ink at a surface lifetime of 15 ms, if the time taken for the ink discharged from the extreme downstream nozzle in the direction of recording medium conveyance to be heated after the ink is attached to the recording medium is controlled to be 1.5 seconds or less after the ink is attached onto the recording medium, the ink attached to the recording medium is dried before the ink flows, which makes it possible to prevent occurrence of color bleed and keep the gamut coverage high after the processing fluid is applied. In particular, for four colors of yellow, magenta, cyan, and black, the bright color gamut increases due to additive color mixture of yellow, magenta, and cyan and bleeding of yellow, magenta, and cyan on black. However, this has an adverse impact on the dark color gamut in some occasions. Therefore, prevention of color bleed leads to enlarging the dark color gamut. As a result, the gamut cover can be kept high.

The time taken for the ink discharged from the extreme downstream nozzle in the direction of recording medium conveyance to be heated after the ink is attached to a recording medium means the time when the ink discharged from the extreme downstream nozzle in the direction of recording medium conveyance is substantially started to be heated. Specifically, it is represented by the time from when the ink discharged from the extreme downstream nozzle in the direction of recording medium conveyance is attached to the recording medium until when the recording medium on which the ink is attached passes through the vicinity of the heating device or the position in contact with the heating device. The position where the recording medium is in the vicinity of the heating device or the position in contact with the heating device is where the recording medium contacts the heating roller when a heating roller is used as the heating device or where the recording medium passes through the vicinity of a blower or IR drier when a blower or an IR drier in non-contact manner is used as the heating device.

In the present disclosure, it is preferable that the color ink be applied to a recording medium after the black ink be applied thereto in the ink application. If the color ink is applied to a recording medium after the black ink is applied thereto, the black ink can obtain the most effective aggregation effect of the processing fluid, thereby obtaining an image with good text legibility and less bleeding.

It is preferable that the following relationship be satisfied: $\gamma(k) > \gamma(c)$. When the dynamic surface tension of the black ink is greater than the dynamic surface tension of the color ink, it is possible to prevent the black color, which is most noticeable, from flowing into a color other than the black, thereby reducing color bleed.

$|\gamma(s)-\gamma(k)|$ is preferably 20 mN/m or less, more preferably 15 mN/m or less, and furthermore preferably 10 mN/m or less in absolute value, where $\gamma(s)$ represents the dynamic surface tension of the processing fluid at a surface lifetime of 15 ms.

In addition, it is also preferable that the following relationship be satisfied: $\gamma(s) > \gamma(k)$. When the surface tension of the ink is lower than the surface tension of the processing fluid, the ink spreads on the recording medium while the aggregation effect is maintained whether or not the processing fluid is dried, thereby obtaining an image having a high image density and saturation and improving the gamut coverage after the processing fluid is applied.

The dynamic surface tension of the black ink at a surface lifetime of 15 ms is preferably from 20 to 40 mN/m and more preferably from 26 to 36 mN/m.

The dynamic surface tension of at least one color ink other than the black ink at a surface lifetime of 15 ms is preferably from 15 to 35 mN/m and more preferably from 21 to 31 mN/m.

When there are multiple dynamic surface tensions for the at least one color ink, if the multiple dynamic surface tensions at a surface lifetime of 15 ms are the same, this same value is adopted. If the multiple dynamic surface tensions are different, the average thereof is calculated and adopted.

The dynamic surface tension of the processing fluid at a surface lifetime of 15 ms is preferably from 25 to 55 mN/m and more preferably from 31 to 50 mN/m.

The dynamic surface tension of the ink and the processing fluid can be measured by, for example, using a portable surface tensiometer (SITA DynoTester, manufactured by EKO Instruments Co., Ltd.) at 25 degrees C. and a surface lifetime of 15 ms.

In the present disclosure, in the RGB color model, when the background is R: 255, G: 0, B: 0, the pattern is gray 6.25 percent and the color of the pattern is black, the L* value in the L*a*b* color space of black dots of the printed image is preferably 22 or less. When L* value is 22 or less, the gamut coverage of a low-lightness area increases, so that the gamut coverage in the dark area is improved. To make the L* value of black dots 22 or less, for example, it is preferable to increase the proportion of the carbon black in black ink or reduce bleeding of color ink on black dots. In addition, the image forming method of the present disclosure can reduce bleeding of color ink on black dots.

Application of Processing Fluid and Processing Fluid Application Device

The application of the processing fluid includes applying the processing fluid to a recording medium and is executed by a processing fluid application device.

The method of applying the processing fluid to a recording medium is not particularly limited and can be suitably selected to suit to a particular application. For example, an inkjet method or an application method is suitably used.

The inkjet method is not particularly limited and can be suitably selected to suit to a particular application. For example, it is possible to use an on-demand type head utilizing a piezoelectric element actuator utilizing PZT, etc., and an actuator utilizing electrostatic force and employing a method utilizing a thermal energy or a charge control type head employing a continuous spraying method.

Specific examples of such an application method include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, and a die coating method. Of these, the wire bar coating method and the roll coating method are particularly preferable.

The application amount of the processing fluid has no particular limit and can be suitably selected to suit to a particular application. For example, the specific application amount is preferably from 0.1 to 10 g/m$^2$ and more preferably from 0.3 to 1.5 g/m$^2$.

Recording Medium

The recording medium is not particularly limited and can be suitably selected to suit to a particular application. Plain paper, gloss paper, special paper, cloth, film, transparent sheet, and general-purpose printing paper, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less within 30 msec1/2 of the contact of the ink according to Bristow method.

For example, plastic films such as vinyl chloride resin film, polyethylene terephthalate (PET) film, polypropylene film, polyethylene film, and polycarbonate film are suitably used as the non-permeable substrate.

The recording media are not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

In particular, the recording medium suitable for the present disclosure includes a substrate, a coated layer provided on at least one surface of the substrate, and other optional other layers.

As the recording medium, continuous paper is preferably used.

Examples of the continuous paper include, but are not limited to, machine-glazed paper wound up into a roll, and regularly folded fanfold paper.

As such continuous paper, commercially available products can be used. Specific examples of the commercially available products include, but are not limited to, LAG90, LAG130, and LAG200 (all manufactured by Stora Enso AB).

Processing Fluid

The processing fluid contains at least one of a multivalent metal salt and a cationic polymer, an organic solvent, water, and other optional components.

Multivalent Metal Salt

The multivalent metal salt aggregates with a coloring material in the ink due to the action of charges therewith and forms agglomeration of the coloring material in the ink to separate the coloring material from the liquid phase and accelerate fixing on a recording medium. The processing fluid contains a highly-concentrated multivalent metal salt in the processing fluid, thereby preventing beading on a low ink absorptive recording medium. Therefore, quality images can be formed.

The multivalent metal salt has no specific limit and can be suitably selected to suit to a particular application. Examples are salts and organic acid metal salts such as titanium compounds, chromium compounds, copper compounds, cobalt compounds, strontium compounds, barium compounds, iron compounds, aluminum compounds, calcium compounds, magnesium compounds, zinc compounds, and nickel compounds. These can be used alone or in combination. Of these, in terms of effectively aggregating pigments as the coloring material in the ink, salts of calcium compounds, magnesium compounds, and nickel compounds are preferable, and alkali earth metal salts of calcium, magnesium, etc. are more preferable.

The multivalent metal salt is preferably ionic and when the multivalent metal salt is a magnesium salt, stability of the reaction solution becomes better.

There is no specific limit to the magnesium compound and it can be suitably selected to suit to a particular application. Specific examples include, but are not limited to, magnesium chloride, magnesium acetate, magnesium sulfate, magnesium nitrate, and magnesium silicate.

There is no specific limit to the calcium compound and it can be suitably selected to suit to a particular application. Specific examples include, but are not limited to, calcium carbonate, calcium nitrate, calcium chlorinate, calcium acetate, calcium sulfate, and calcium silicate.

There is no specific limit to the barium compound and it can be suitably selected to suit to a particular application. For example, barium sulfate is usable.

The zinc compound has no specific limit and is suitably selected to a particular application. For example, zinc sulfate and zinc carbonate are usable.

The aluminum compound has no specific limit and is suitably selected to a particular application. For example, aluminum silicate and aluminum hydroxide are usable.

Of these, magnesium sulfate, magnesium nitrate, and calcium nitrate are preferable.

The organic acid metal salt is not particularly limited and can be suitably selected to suit to a particular application. Specific examples include, but are not limited to, calcium salts, magnesium salts, etc., of pantothenic acid, propionic acid, ascorbic acid, acetic acid, and lactic acid.

The proportion of the multivalent metal salt to the total amount of the processing fluid is preferably from 10 to 40 percent by mass and more preferably from 15 to 25 percent by mass. When the proportion is 10 percent by mass or more, the solid portion agglomerates, thereby reducing color bleed and beading. When the proportion is 40 percent by mass or less, precipitation of a multivalent metal salt at the time of water evaporation can be reduced.

Cationic Polymer

The cationic polymer forms an aggregate of a coloring material due to the action of charges with the coloring material in the ink, thereby separating the coloring material from the liquid phase. This accelerates fixing on a recording medium. In addition, inclusion of the cationic polymer in the processing fluid prevents curling and beading on a low ink absorptive recording medium. As a result, quality images can be formed.

Any suitably synthesized articles and products available on the market are usable as the cationic polymer.

Specific examples of the commercially available products include, but are not limited to, Himax SC-506 (manufactured by Hymo Co., Ltd.) and Himax SC-600L (manufactured by Himo Co., Ltd.).

The proportion of the cationic polymer to the total amount of the processing fluid is preferably from 1 to 60 percent by mass, more preferably from 5 to 50 percent by mass, and particularly preferably from 30 to 40 percent by mass in terms of enhancing agglomeration of a coloring material and reducing occurrence of beading.

Organic Solvent

The organic solvent is not particularly limited and can be suitably selected to suit to a particular application. A water-soluble organic solvent is preferable. Specific examples include, but are not limited to, ethers such as polyols, polyol alkyl ethers, and polyol aryl ethers, nitrogen-containing heterocyclic compounds, amides, amines, and sulfur-containing compounds.

Specific examples of the organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1, 3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, □-caprolactam, and □-butyrolactone; amides such as formamide, N-methyl formamide, N,N-dimethyl formamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and also impart a good drying property, it is preferable to use an organic solvent having a boiling point of 250 degrees C. or lower.

The proportion of the organic solvent to the total amount of the processing fluid is not particularly limited and can be suitably selected to suit to a particular application. For example, it is preferably from 10 to 60 percent by mass and more preferably from 20 to 60 percent by mass.

Water

As the water, for example, pure water such as deionized water, ultrafiltered water, reverse osmosis water, and distilled water and ultra pure water are suitable. These can be used alone or in combination.

The proportion of the water to the total amount of the processing fluid is preferably 65 percent by mass or less and more preferably from 30 to 50 percent by mass. When the amount is 65 percent by mass or less, it is easy to reduce viscosity increase of processing fluid, gelation, and precipitation of insoluble material at water evaporation.

Other Components

The other optional components are not particularly limited and can be suitably selected to suit to a particular application. Examples thereof are a surfactant, a defoaming agent, a pH regulator, an antibacterial agent, a corrosion inhibitor, and an antioxidant.

Surfactant

Surfactants decrease the surface tension of the processing fluid and improve wettability thereof to various recording media, which makes it possible to uniformly apply the processing fluid. To each recording medium, the permeation speed of the processing fluid, which is suitably wettable due to a surfactant, increases, thereby reducing drawbacks such as fixability and bleeding.

In particular, permeation of the processing fluid to various types of recording media is extremely emphasized. If the processing fluid does not easily permeate a recording medium, the processing fluid tends to pool around the surface of the recording medium. This pooled processing fluid is brought into contact with an ink and causes the coloring material therein to excessively agglomerate. This may decrease the dot diameter, resulting in occurrence of insufficient filling of the image. In addition, this coloring material excessively accumulating on the surface of the recording medium may have an adverse impact on fixability (abrasion resistance).

As the surfactant, it is possible to use any of silicone-based surfactants, fluorochemical surfactants, amphoteric surfactants, nonionic surfactants, or anionic surfactants.

The silicone-based surfactant has no particular limit and can be suitably selected to suit to a particular application. Of these, preferred are silicone-based surfactants which are not decomposed even in a high pH environment. Examples are side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluoro-surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

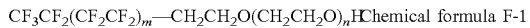

$$CF_3CF_2(CF_2CF_2)_m—CH_2CH_2O(CH_2CH_2O)_nH \quad \text{Chemical formula F-1}$$

In the compound represented by Chemical formula F-1, m is preferably 0 or an integer of from 1 to 10 and n is preferably 0 or an integer of from 1 to 40.

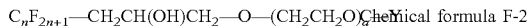

$$C_nF_{2n+1}—CH_2CH(OH)CH_2—O—(CH_2CH_2O)_a Y \quad \text{Chemical formula F-2}$$

In the Chemical formula F-2, Y represents H, $C_nF_{2n+1}$, where "n" is an integer of from 1 to 6, $CH_2CH(OH)CH_2—C_nF_{2n+1}$, where "n" represents an integer of from 4 to 6, or $C_pH_{2p+1}$, where p represents an integer of from 1 to 19. "a" represents an integer of from 4 to 14.

Any product of the fluorochemical surfactants available on the market can be used. Specific examples of the products available on the market include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, and UR (all manufactured by E. I. du Pont de Nemours and Company); FT-110, FT250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these, FS-300 (manufactured by E. I. du Pont de Nemours and Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation to paper, wettability, and uniform dying property.

The proportion of the surfactant is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

pH Regulator

An acidic processing fluid may corrode metal parts of a processing fluid application device. To prevent such drawbacks over an extended period of use, it is suitable to contain a pH regular.

Specific examples include, but are not limited to, 2-amino-2-methyl-1,3-propane diol and 2-amino-2-ethyl-1,3-propane diol. These can be used alone or in combination. It is preferable to adjust the amount of pH regulator in such a manner that the pH of the processing fluid range from 4 to 12.

Antibacterial Agent

Specific examples of the antibacterial agent include, but are not limited to, dehydrosodium sulfate, sodium sorbinate, sodium 2-pyridine thiol-1-oxide, sodium benzoate, and sodium pentachlorophenol. These can be used alone or in combination.

Corrosion Inhibitor

Specific examples of the corrosion inhibitor include, but are not limited to, acid sulfite, thiosodium sulfate, antimony thioglycollate, diisopropyl ammonium nitrite, pentaerythritol tetranitrate, and dicyclohexyl ammonium nitrite. These can be used alone or in combination.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants. These can be used alone or in combination.

Property of Processing Fluid

The property of the processing fluid is not particularly limited and can be suitably selected to suit to a particular application. The property includes, for example, viscosity and pH.

Viscosity.

Viscosity of the cleaning liquid at 25 degrees C. is preferably from 0.5 to 30 mPa·s and more preferably from 1 to 20 mPa·s. Viscosity can be measured by a viscometer (RE-550L, manufactured by TOKI SANGYO CO., LTD.), etc.

pH of the processing fluid is preferably from 4 to 12 and more preferably from 4 to 8 at 25 degrees C.

Ink Application and Ink Application Device

In the ink application, an ink is applied onto a recording medium to which the processing fluid is applied by an ink application device.

The ink application method has no particular limit and can be suitably selected to suit to a particular application. For example, inkjet methods and dispenser methods are suitable. Of these, the inkjet method is particularly preferable.

The inkjet method has no specific limit and can be suitably selected to suit to a particular application. For example, it is possible to use an on-demand type head utilizing a piezoelectric element actuator using PZT, etc., and an actuator utilizing electrostatic force and employing a method utilizing a thermal energy or a charge control type head employing a continuous spraying method.

The application ratio (processing fluid:ink) of the processing fluid to a recording medium to the ink to the recording medium is preferably from 1/5 to 1/100 and more preferably from 1/10 to 1/30. When the application amount of the processing fluid is 1/100 or less of the application amount of the ink, the occurrence of color bleed and beading can be reduced and the image quality can be improved. Further, when the application amount of the processing fluid is 1/5 or more of the application amount of the ink, the drying property of an obtained image is good, productivity is improved, and the occurrence of curling and cockling can be prevented.

As the ink, black ink and at least one color ink other than the black ink are used.

Ink

The organic solvent, water, coloring material, resins, and additives for use in the ink are described below.

Resin

The type of the resin has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Resin particles formed of these resins may be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. These resin particulate can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and particularly preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total amount of the ink.

Coloring Material

The coloring material has no specific limit and is suitably selected to suit to a particular application. For example, pigments and dyes are usable.

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancing image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency in the maximum number conversion is preferably 20 to 500 nm and more preferably 20 to 150 nm to improve dispersion stability of the pigment and ameliorate discharging stability and image quality such as image density.

The particle diameter of the pigment can be measured by, for example, using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc., to remove coarse particles followed by degassing.

Organic Solvent

The organic solvent has no specific limit and can be suitably selected to suit to a particular application. For example, water-soluble organic solvents are usable. Examples are polyols, ethers such as polyol alkylethers and polyol arylethers, nitrogen-containing heterocyclic compounds, amides, amines, sulfur-containing compounds, etc.

Specific examples of the polyhydric alcohol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl-1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkylethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol arylethers include, but are not limited to, ethylene glycol monophenylether and ethylene glycol monobenzylether.

Specific examples of nitrogen-containing heterocyclic compounds include, but are not limited to, 2-pyrrolidone, N-methyl-2-pyrrolidone, N-hydroxyethyle-2-pyrrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate and ethylene carbonate can be used as the organic solvent.

To serve as a humectant and impart a good drying property, it is preferable to use an organic solvent having a boiling point of 250 degrees C. or lower.

Polyhydric alcohol compounds having eight or more carbon atoms and glycol ether compounds are also suitable as the organic solvent. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyhydric alcohol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of the ink, the proportion is preferably from 10 to 60 percent by mass and more preferably from 20 to 60 percent by mass.

Water

As the water, for example, pure water and ultrapure water such as deionized water, ultrafiltered water, reverse osmosis water, and distilled water are suitable. These can be used alone or in combination.

The proportion of water in the total amount of ink is not particularly limited and can be suitably selected to suit to a particular application. In terms of drying property and discharging reliability of the ink, the proportion is preferably from 10 to 90 percent by mass and more preferably from 20 to 60 percent by mass.

Additive

The ink may furthermore optionally contain additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, silicone-based surfactants not decomposed even in high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, a perfluoroalkyl sulfonic acid and a salt of perfluoroalkyl sulfonic acid.

Specific examples of the perfluoroalkyl carboxylic acid compounds include, but are not limited to, a perfluoroalkyl carboxylic acid and a salt of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluoro-surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical structure S-1

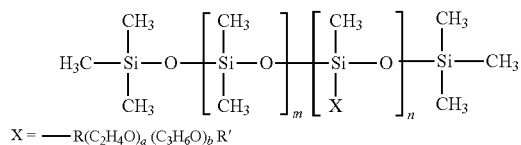

$X = \text{—}R(C_2H_4O)_a(C_3H_6O)_b R'$

In Chemical formula S-1, "m", "n", "a", and "b" each, respectively independently represent integers, R represents an alkylene group, and R' represents an alkyl group.

The polyether-modified silicone-based surfactant is commercially available.

Specific examples include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

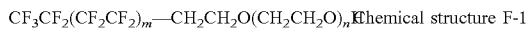

$CF_3CF_2(CF_2CF_2)_m\text{—}CH_2CH_2O(CH_2CH_2O)_n$ Chemical structure F-1

In the compound represented by Chemical formula F-1, m is preferably 0 or an integer of from 1 to 10 and n is preferably 0 or an integer of from 1 to 40.

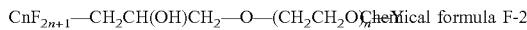

$CnF_{2n+1}\text{—}CH_2CH(OH)CH_2\text{—}O\text{—}(CH_2CH_2O)_n$ Chemical formula F-2

In the compound represented by the chemical formula F-2, Y represents H or $C_mF_{2m+1}$, where m represents an integer of from 1 to 6, or $CH_2CH(OH)CH_2\text{—}C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7.

Specific examples include, but are not limited to, amines such as diethanol amine and triethanol amine.

Property of Ink

The property of the ink is not particularly limited and can be suitably selected to suit to a particular application. The property includes, for example, viscosity and pH.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Rotational frequency: 50 rotations per minute (rpm)
25 degrees C.
Measuring time: three minutes.

pH of the ink is preferably from 7 to 12 and more preferably from 8 to 11 in terms of prevention of corrosion of metal material in contact with liquid.

Heating and Heating Device

The heating is to heat a recording medium to which the ink is applied and can be conducted by a heating device (heater).

The heating device heats the printing surface and the back surface of the recording medium to which the ink is applied. Examples of the heating device includes an infrared heater, a hot air heater, a heating roller, hot plate, a high frequency heating device, and a microwave heating device. These can be used alone or in combination.

The method of heating the recording medium is not particularly limited and can be suitably selected to suit to a particular application. Examples of the method include, but are not limited to, a method of heating the recording medium to which the ink is applied by bringing a heated fluid such as warm air as a heating device into contact with the recording medium, a method of transferring heat from a heating member to an ink applied recording medium by contact, and a method of heating the recording medium to which the ink is applied with energy rays such as infrared rays or far infrared rays.

The heating temperature is preferably from 40 to 100 degrees C. and more preferably from 50 to 90 degrees C. When the heating temperature is in the range of from 40 to 100 degrees C., damage to a non-permeating recording medium due to heat can be prevented and non-discharging ascribable to a warmed ink discharging head can be reduced.

Other Processes and Other Devices

The other processes are not particularly limited and can be suitably selected to suit to a particular application. For example, a control process is selected.

The other devices are not particularly limited and can be suitably selected to suit to a particular application. For example, a control device is selected.

Here, an example of the image forming apparatus and the image forming method of the present disclosure will be described with reference to FIGS. 1 and 2.

An image forming apparatus 200 illustrated in FIG. 1 includes a liquid application unit 101 including a liquid discharging head as an ink application device that discharges and applies a desired color ink to a recording medium 110 as a conveyed member, a processing fluid application unit 120 that applies a processing fluid to the recording medium 110 before the ink is applied to the recording medium 110, and a heating device 130 that heats the recording medium 110 onto which the ink has been applied. Specifically, an example of the heating device 130 is a heating roller 131.

The liquid application unit 101 includes four color full line heads 111A, 111B, 111C, and 111D (collectively referred to as 111) disposed in this order upstream in the direction of conveyance of the recording medium 110. Each head 111 of the four heads individually discharges black K, cyan C, magenta M, and yellow Y to the recording medium 110. The type and the number of colors are not limited thereto.

The recording medium 110 is unreeled from a reeling roller 102, sent out onto a conveyance guide 113 disposed facing the liquid application unit 101 by a conveyance roller 112 of a conveyance unit 103, and guided by the conveyance guide 113.

The recording medium 110 to which the ink is applied by the liquid application unit 101 is sent by an ejection roller 114 to a reel-up roller 105 via a heating device 130 and reeled up by the ejection roller 114.

The heating device 130 will be specifically described with reference to FIG. 1.

The time taken for the ink discharged from the extreme downstream nozzle in the direction of recording medium conveyance to be heated after the ink is attached to a recording medium is represented by the time taken for the recording medium 110 to pass between the position X where the ink discharged from the extreme downstream nozzle in the head 111D illustrated in FIG. 1, which is disposed extreme downstream in the direction of conveyance of recording medium 110 is attached to the recording medium 110 and the position Y where the heating roller 131 as the heating device contacts the recording medium 110. When the time taken for the ink discharged from the extreme downstream nozzle in the direction of recording medium conveyance to be heated after the ink is attached to a recording medium is set at 1.5 seconds or less, it is possible to reduce bleeding between printing colors even for a heavy attachment of ink. When the time taken for the ink discharged from the extreme downstream nozzle in the direction of recording medium conveyance to be heated after the ink is attached to a recording medium is over 1.5 seconds, the attachment of the ink increases so that the color reproducibility in a region with a low brightness starts deteriorating, thereby increasing the degree of deterioration of gamut coverage. In addition, as the time taken for the ink discharged from the extreme downstream nozzle in the direction of recording medium conveyance to be heated after the ink is attached to a recording medium increases, the ink layer in which a bright color such as yellow covers a low bright color such as black is confirmed to thicken so that the lightness ($L^*$) of black in a mixed color image and gamut coverage are negatively proportional. That is, when the time taken for the ink discharged from the extreme downstream nozzle in the direction of recording medium conveyance to be heated after the ink is attached to a recording medium is controlled to be 1.5 seconds or less, the gamut coverage increases as the lightness of black is kept low, thereby reducing the degree of deterioration of the gamut coverage caused by the application of processing fluid. The image forming apparatus illustrated in FIG. 1 includes only a single heating device 130 but may include two or more heating devices 130. For example, in FIG. 3, two heating devices 130A and 130B are used as the heating rollers.

Figure 3:
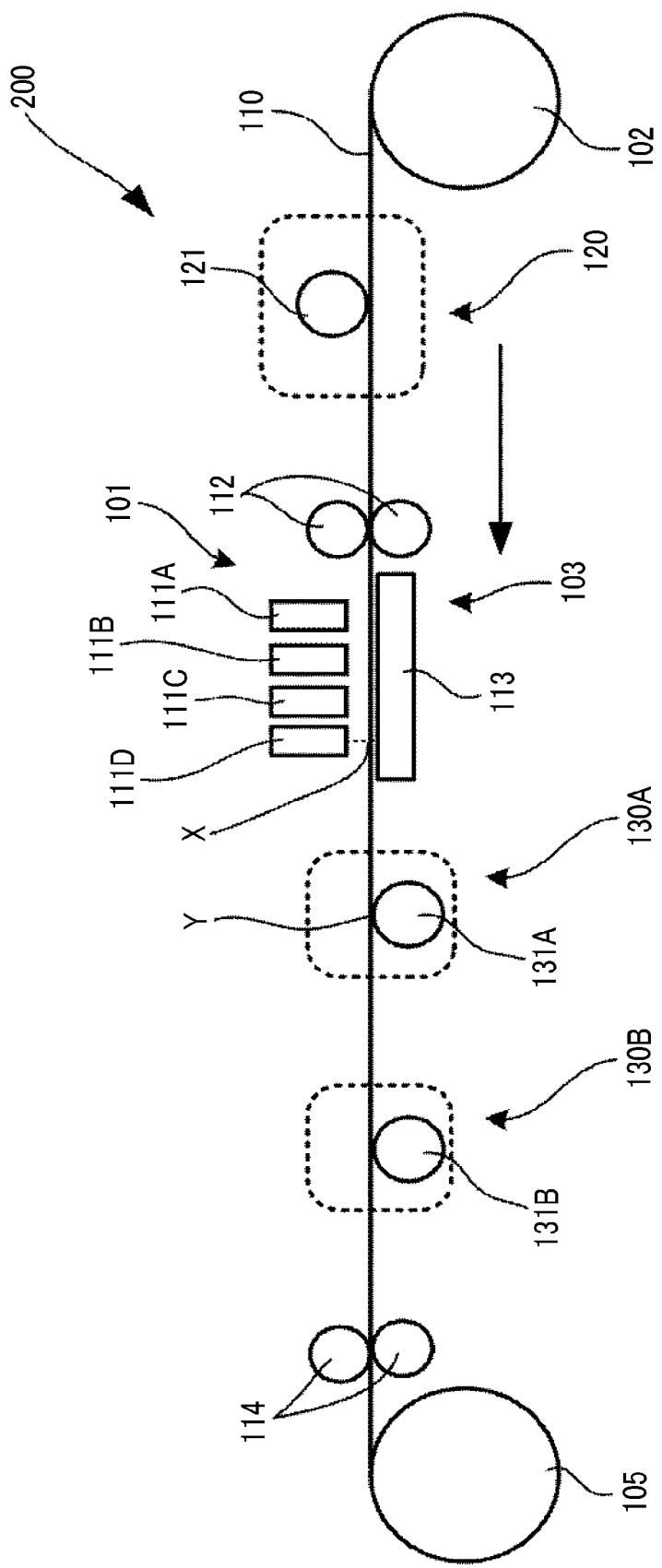
FIG. 3 is a schematic diagram illustrating another example of the image forming apparatus according to an embodiment of the present disclosure.

In this case, the time taken for the ink discharged from the extreme downstream nozzle in the direction of recording medium conveyance to be heated after the ink is attached to a recording medium is represented by the time taken for the recording medium 110 to pass between the position X where the ink discharged from the extreme downstream nozzle in the head 111D illustrated in FIG. 3 disposed extreme downstream in the direction of recording medium conveyance is attached to the recording medium 110 and the position Y where the heating roller 131A disposed on the side of the head contacts the recording medium 110, as illustrated in FIG. 1.

As the heating device 130, a blowing device or an IR dryer can be used and a heating roller and a blowing device can be used in combination. It is preferable to use a warm air blower as the blowing device.

Figure 4:
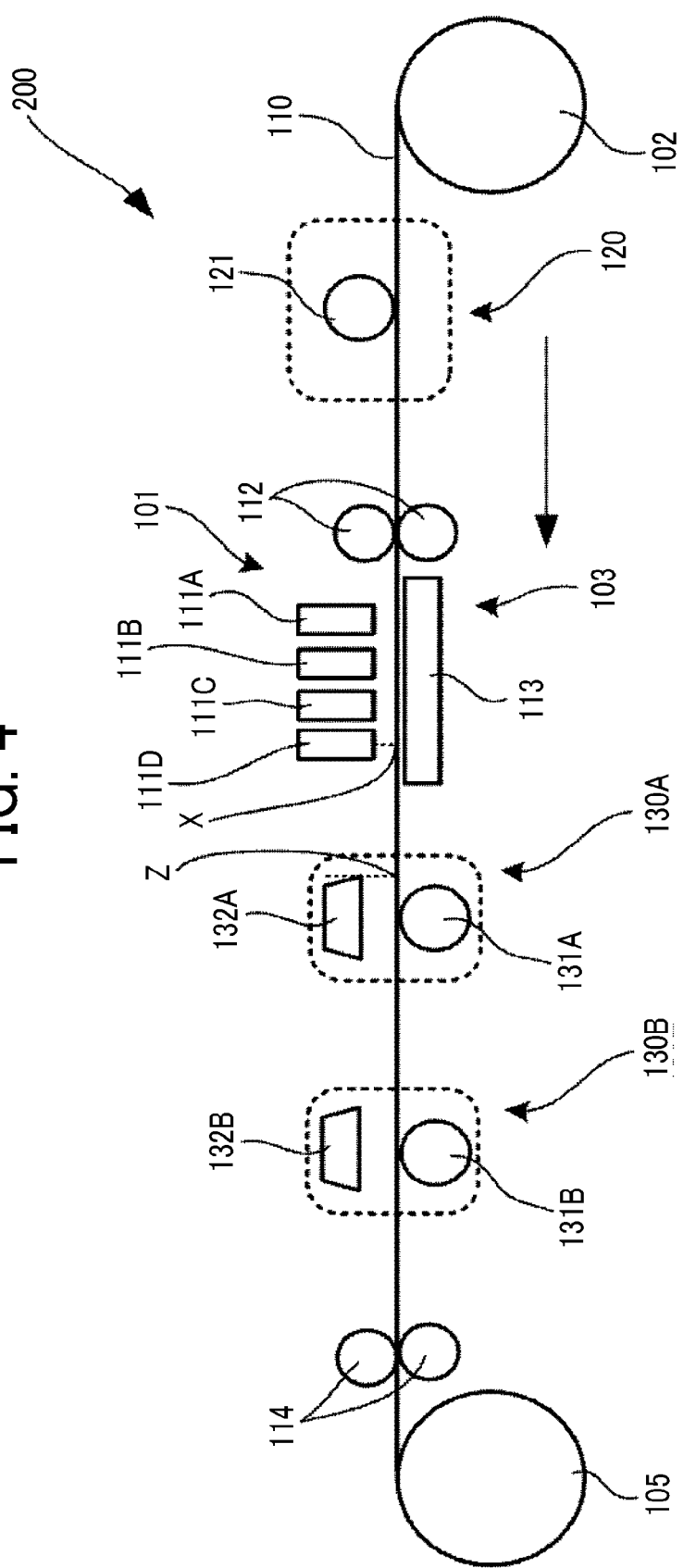
FIG. 4 is a schematic diagram illustrating another example of the image forming apparatus according to an embodiment of the present disclosure.

For example, in FIG. 4, two of the heating device 130A and the heating device 130B are used, each of which includes a combination of the heating roller 131A and the blowing device 132A and a combination of a heating roller 131B and the blowing device 132B.

In this case, the time to be taken for the ink discharged from the extreme downstream nozzle in the direction of recording medium conveyance to be heated after the ink is attached to a recording medium is represented by the time taken for the recording medium 110 to pass between the position X where the ink discharged from the extreme downstream nozzle of the head 111D illustrated in FIG. 4 disposed extreme downstream in the direction of recording medium conveyance is attached to the recording medium 110 and the position Z of the front part of the blowing device 132A disposed on the side of the head.

Figure 5:
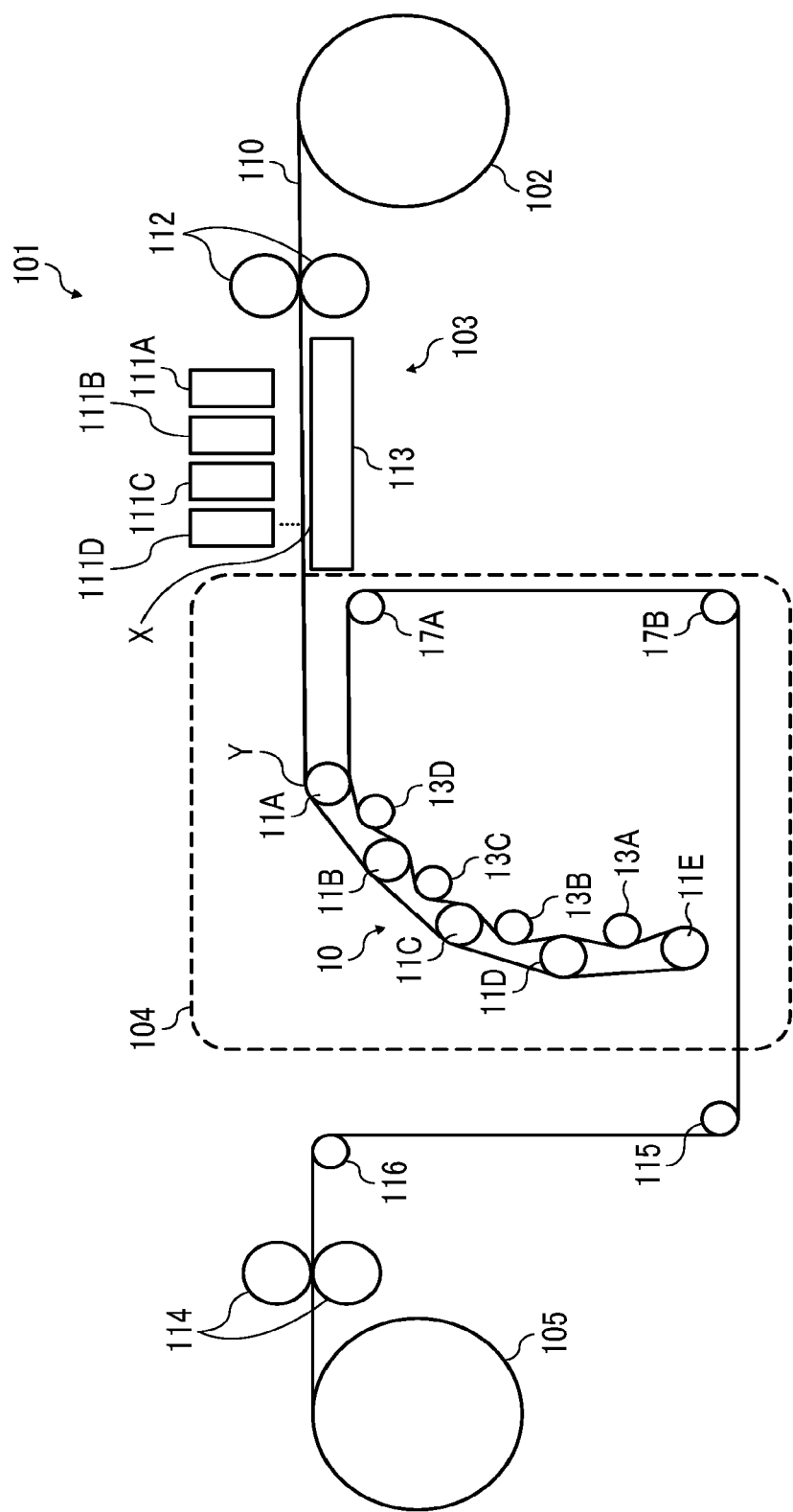
FIG. 5 is a schematic diagram illustrating another example of the image forming apparatus according to an embodiment of the present disclosure.
Figure 6:
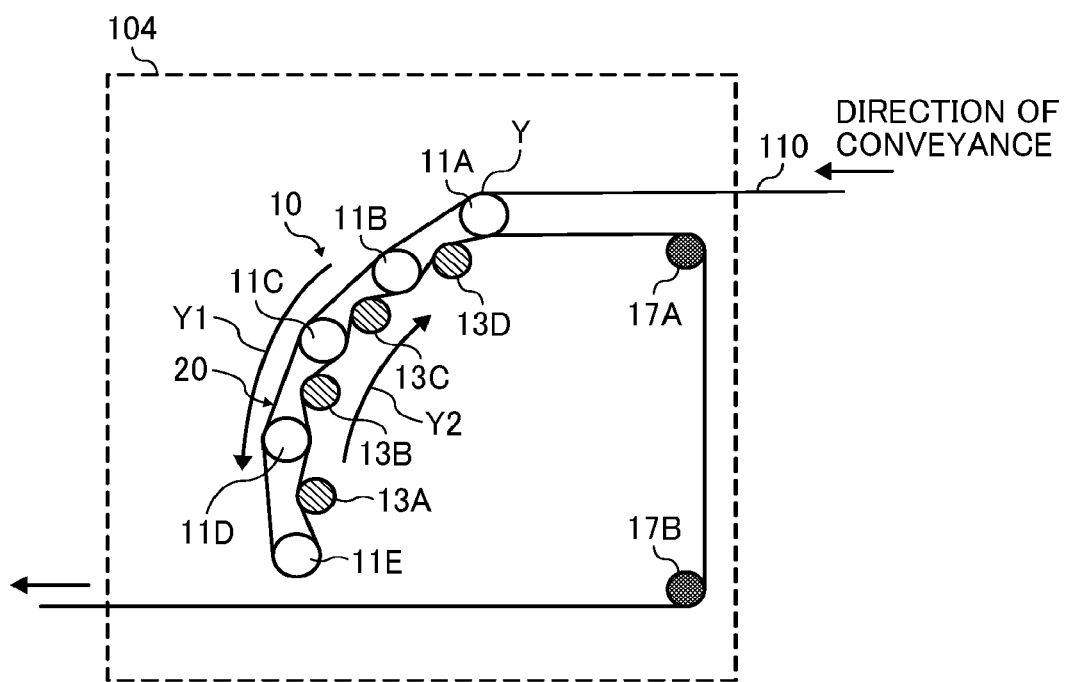
FIG. 6 is a schematic diagram illustrating an enlarged view of a heating device in the image forming apparatus illustrated in FIG. 5.

Moreover, as illustrated in FIG. 5 and FIG. 6, which is an enlarged diagram of FIG. 5, a drying device 104 having a plurality of heating rollers can be used. The line-type high-speed printing apparatus is required to improve the drying property, but if a large number of heating devices are installed, the apparatus becomes large. As illustrated in FIG. 5, if the rollers are disposed in an arc so as to be in contact with a single heating roller a plurality of times, it is possible to reduce the size of the drying device and improve the drying property.

The drying device 104 includes a contact heater 10 to heat the recording medium 110 in contact with the opposite side to the side to which the fluid is applied. In addition, the drying device 104 also includes guiding rollers 17A and 17B to guide the recording medium 110 after the recording medium 110 passes the contact heater 10.

The contact heater 10 includes heating rollers 11A to 11E (representatively referred to as heating roller 11) as the first heating members, each of which has a contact surface having a curved form constituting the periphery in contact with the recording medium 110. In addition, the contact heater 10 includes contact guiding rollers 13A to 13D as the contact guiding member to guide the recording medium 110 so as to contact the contact surface of the heating rollers 11D to 11A.

Figure 2:
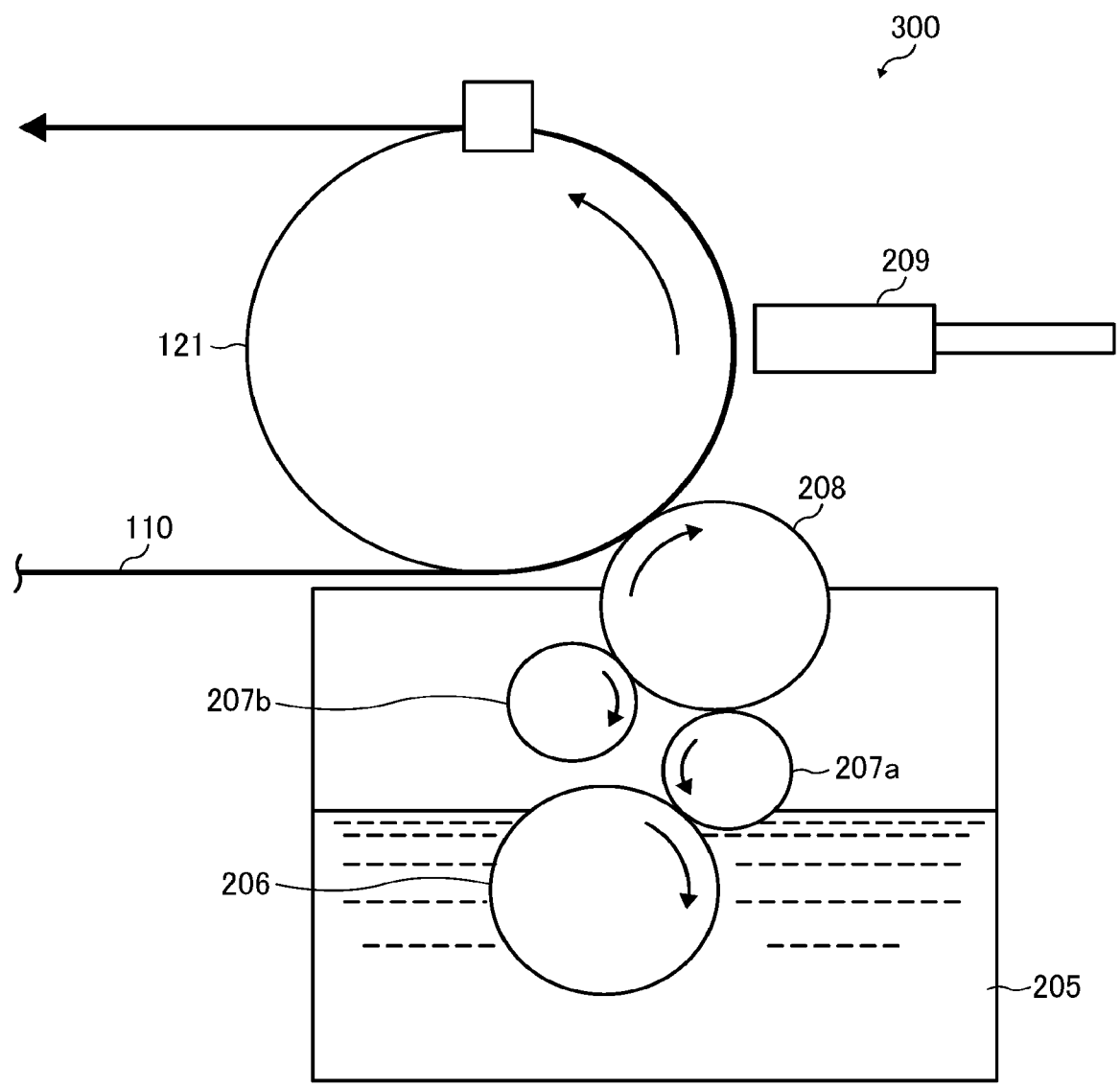
FIG. 2 is a schematic diagram illustrating an example of a processing fluid application device that applies a processing fluid.

In this case, the time taken for the ink discharged from the extreme downstream nozzle in the direction of recording medium conveyance to be heated after the ink is attached to a recording medium is represented by the time taken for the recording medium 110 to pass between the position X where the ink discharged from the extreme downstream nozzle in the head 111D disposed extreme downstream in the inkjet head illustrated in FIG. 5 in the direction of recording medium conveyance is attached to the recording medium 110 and the position Y where the heating roller 11A disposed on the side of the head contacts the recording medium 110, as illustrated in FIG. 2.

Next, the processing fluid application unit 120 is provided with a counter roller 121 to apply the processing fluid.

The processing fluid application unit 120 will be specifically described with reference to FIG. 2. FIG. 2 is a schematic diagram illustrating an example of a processing fluid application device 300 to apply a processing fluid. As illustrated in FIG. 2, the conveyance roller 112 conveys the recording medium 110 into the processing fluid application device 300.

The processing fluid application device 300 stores a processing fluid 205, which is transferred to the roller surface of an application roller 208 in a thin film form by a stirring and supplying roller 206 and a conveying and thin-film forming rollers 207a and 207b.

Thereafter, the application roller 208 rotates while being pressed against a rotatable counter roller 121 and the processing fluid 205 is applied to the surface of the recording medium 110 while the recording medium 110 passes between the application roller 208 and the rotatable counter roller 201.

In addition, the counter roller 121 can adjust the nipping pressure by a pressure adjuster 209 when the processing fluid is applied, so that the application amount of the processing fluid 205 can be changed.

In addition, the application amount can be adjusted by changing the rotation speed of the application roller 208.

The application roller 208 and a platen roller are driven by a power source such as drive motor. The rotation speed thereof can be changed by changing the energy of the power source to control the application amount.

In addition to the roller application method described above, it is also possible to apply the processing fluid employing a discharging method such as spraying. Alternatively, a head for applying processing fluid may be disposed extreme upstream of the liquid application unit 101 in the direction of conveyance to apply the processing fluid in an inkjet method.

Set of Ink and Processing Fluid

The set of the present disclosure contains a black ink and at least one color ink other than the black ink and a processing fluid, wherein an image forming apparatus including a processing fluid application device configured to apply the processing fluid to a recording medium, an ink application device including nozzles including an extreme downstream nozzle in the direction of recording medium conveyance, the ink application device being configured to apply the ink to the recording medium onto which the processing fluid has been applied and a heating device configured to heat the recording medium onto which the processing fluid has been applied, wherein the time taken for the recording medium onto which the ink has been applied to pass through the vicinity or the position of the heating device is 1.5 seconds or less after the ink discharged from the extreme downstream nozzle is attached to the recording medium, wherein the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms.

The set is preferable that the following relationship be satisfied: $\gamma(k) > \gamma(c)$.

It is preferable that the following relationship be satisfied: $|\gamma(s)-\gamma(k)| \leq 20$ mN/m, where $\gamma(s)$ represents a dynamic surface tension of the processing fluid at a surface lifetime of 15 ms.

It is preferable that the following relationship be satisfied: $\gamma(s) > \gamma(k)$.

The processing fluid preferably contains a multivalent metal salt and/or a cationic polymer.

The multivalent metal salt is preferably a magnesium salt.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1 of Pigment Dispersion

Preparation of Pigment Dispersion 1

1,000 g of carbon black (Raven 1080, available from Colombian Carbon Japan Co.), 800 g of the Copolymer A solution, 143 g of 10 percent sodium hydroxide aqueous solution, 100 g of methylethyl ketone, and 1,957 g of water were loaded in a mixing tank equipped with a jacket for cooling and stirred and mixed.

The thus-obtained liquid mixture was dispersed by a dispersion device (SC mill SC100, manufactured by Mitsui Mining Company) filled with zirconia beads having a diameter of 0.3 mm for six hours in a circulation manner (liquid dispersion out of the dispersion device returned to the mixing tank). The rotational frequency of the dispersion device was 2,700 rotation per minute (rpm), and cold water was caused to pass through the jacket for cooling to keep the temperature of the liquid dispersion at 40 degrees C. or lower. After the dispersion was completed, the undiluted liquid dispersion solution was extracted from the mixing tank.

Next, the mixing tank and the dispersion device flow path were rinsed with 10,000 g of water and mixed with the undiluted liquid dispersion to obtain diluted liquid dispersion. The diluted liquid dispersion was placed in a glass distillator to distill away all of methylethyl ketone and a part of water. After the system was cooled down to room temperature, 10 percent by mass hydrochloric acid was dripped to the distillator to control pH to 4.5 during stirring. Thereafter, the solid portion was filtrated and rinsed with water by Nutsche filtration equipment (pressure filtration equipment, manufactured by Japan Chemical Engineering & Machinery Co, Ltd.).

The thus-obtained cake was taken to a vessel and 200 g of 20 percent by mass potassium hydroxide aqueous solution was added thereto. Thereafter, the resultant was dispersed by a dispersion device (TK homodisper, manufactured by PRIMIX Corporation). Moreover, water was added thereto to adjust the non-volatile portion to obtain Pigment dispersion 1, which was dispersed in an aqueous medium as a complex particle in which carbon black having a non-volatile portion in an amount of 20 percent by mass was covered with a styrene-acrylic-based copolymer having a carboxyl group neutralized in potassium hydroxide.

Preparation Examples 2 to 4 of Pigment Dispersion

Preparation of Pigment Dispersions 2 to 4

Pigment dispersions 2 to 4 were obtained in the same manner as in Preparation Example 1 of Pigment Dispersion 1 except that carbon black was replaced with cyan inks (C1 to C2) by copper phthalocyanine (SEIKALIGHT BLUE A612, manufactured by Dainichiseika Color & Chemicals Mfg. Co., Ltd.) and magenta ink (M1 to M2) by Pigment Red 122 (Toner Magenta EO02, manufactured by Clariant AG), and Yellow Ink (Y1 to Y2) by Pigment Yellow 74 (First Yellow 531, manufactured by Dainichiseika Color & Chemicals Mfg. Co., Ltd.).

Preparation Example 1 of Ink

Preparation of Black Ink K1

22.5 percent by mass 1,5-pentane diol, 7.5 percent by mass glycerin, 2.0 percent by mass 2-ethyl-1,3-hexane diol, 1.0 percent by mass surfactant (E1010, manufactured by Nisshin Chemical Co., Ltd.), 1.1 percent by mass 2,4,7,9-tetramethyldecane-4,7-diol, 0.2 percent by mass PROXEL LV (manufactured by AVECIA Inkjet Limited), 0.3 percent by mass 2-amino-2-ethyl-1,3-propanediol, and deionized water were uniformly mixed by stirring for one hour. Thereafter, 2.0 percent by mass rosin-modified maleic acid resin (Harimac R-100, manufactured by Harima Chemicals, Inc.) was added thereto followed by uniform mixing by stirring for one hour. Thereafter, Pigment dispersion 1 was added in such a manner that the solid mass was 8.0 percent by mass followed by uniform mixing by stirring for one hour.

The thus-obtained liquid mixture was pressure-filtrated with a polyvinylidene fluoride membrane filter having an average pore diameter of 0.8 μm to remove coarse particles and dust to obtain black ink K1.

Preparation Examples 2 to 9 of Ink

Preparation of Black Inks K2 to K3, Cyan Inks C1 to C2, Magenta Inks M1 to M2, and Yellow Inks Y1 to Y2

Black inks K2 to K3, cyan inks C1 to C2, magenta inks M1 to M2, and yellow inks Y1 to Y2 were prepared in the same manner as in Ink Preparation Example 1 except that the composition and the content were changed to those shown in Tables 1 to 3. The values of the content shown in Tables 1 to 3 are represented in percent by mass.

Dynamic surface tension of each of the obtained inks was measured in the following manner. The results are shown in Tables 1 to 3.

Dynamic Surface Tension

Dynamic surface tension of each ink was measured under the conditions of a temperature of 25 degrees C. and a surface lifetime of 15 ms using a portable surface tensiometer (SITA DynoTester, manufactured by EKO Instruments Co., Ltd.).

Ink Sets 1 to 5

Black inks K1 to K3, cyan inks C1 to C2, magenta inks M1 to M2, and yellow inks Y1 to Y2 were combined as shown in Tables 1 to 3 to obtain Ink sets 1 to 5.

TABLE 1

|  |  | Ink set 1 | | | | Ink set 2 | |
|---|---|---|---|---|---|---|---|
|  |  | K1 | C1 | M1 | Y1 | K1 | C2 |
| Organic solvent | 1,3-butane diol |  | 23 | 23 | 23 |  | 23 |
|  | 1,5-pentane diol | 22.5 |  |  |  | 22.5 |  |
|  | Glycerin | 7.5 | 8 | 8 | 8 | 7.5 | 8 |
|  | 2-ethyl-1,3-hexanediol | 2 | 2 | 2 | 2 | 2 | 2 |
| Coloring material | Pigment dispersion 1 (solid mass) | 8 |  |  |  | 8 |  |
|  | Pigment dispersion 2 (solid mass) |  | 8 |  |  |  | 8 |
|  | Pigment dispersion 3 (solid mass) |  |  | 8 |  |  |  |
|  | Pigment dispersion 4 (solid mass) |  |  |  | 8 |  |  |

TABLE 1-continued

|  |  | Ink set 1 | | | | Ink set 2 | |
|---|---|---|---|---|---|---|---|
|  |  | K1 | C1 | M1 | Y1 | K1 | C2 |
| Resin | Rosin-modified maleic acid resin Halimac R-100 (manufactured by Harima Chemicals, Inc.) | 2 | 2 | 2 | 2 | 2 | 2 |
| Surfactant | E1010 (manufactured by Nissin Chemical co., ltd.) | 1.0 | 1.5 | 1.5 | 1.5 | 1.0 | 1.5 |
| Defoaming agent | 2,4,7,9-tetramethyldecane-4,7-diol | 1.1 | 1.1 | 1.1 | 1.1 | 1.1 | 1.3 |
| Antibacterial agent | PROXEL LV | 0.2 | 0.2 | 0.2 | 0.2 | 0.2 | 0.2 |
| pH regulator | 2-amino-2-ethyl-1,3-propane diol | 0.3 | 0.3 | 0.3 | 0.3 | 0.3 | 0.3 |
| Water | Deionized water | Balance | Balance | Balance | Balance | Balance | Balance |
|  | Total (Percent by mass) | 100 | 100 | 100 | 100 | 100 | 100 |
| Properties | Dynamic surface tension at 15 ms (mN/m) | 34 | 31 | 31 | 31 | 34 | 30 |

TABLE 2

|  |  | Ink set 3 | | | | Ink set 4 | |
|---|---|---|---|---|---|---|---|
|  |  | K2 | C1 | M1 | Y1 | K3 | C1 |
| Organic solvent | 1,3-butane diol |  | 23 | 23 | 23 |  | 23 |
|  | 1,5-pentane diol | 20 |  |  |  | 22.5 |  |
|  | Glycerin | 10 | 8 | 8 | 8 | 7.5 | 8 |
|  | 2-ethyl-1,3-hexanediol | 2 | 2 | 2 | 2 | 2 | 2 |
| Coloring material | Pigment dispersion 1 (solid mass) | 8 |  |  |  | 8 |  |
|  | Pigment dispersion 2 (solid mass) |  | 8 |  |  |  | 8 |
|  | Pigment dispersion 3 (solid mass) |  |  | 8 |  |  |  |
|  | Pigment dispersion 4 (solid mass) |  |  |  | 8 |  |  |
| Resin | Rosin-modified maleic acid resin Halimac R-100 (manufactured by Harima Chemicals, Inc.) | 2 | 2 | 2 | 2 | 2 | 2 |
| Surfactant | E1010 (manufactured by Nissin Chemical co., ltd.) | 1.0 | 1.5 | 1.5 | 1.5 | 1.5 | 1.5 |
| Defoaming agent | 2,4,7,9-tetramethyldecane-4,7-diol | 0.8 | 1.1 | 1.1 | 1.1 | 1.3 | 1.1 |
| Antibacterial agent | PROXEL LV | 0.2 | 0.2 | 0.2 | 0.2 | 0.2 | 0.2 |
| pH regulator | 2-amino-2-ethyl-1,3-propane diol | 0.3 | 0.3 | 0.3 | 0.3 | 0.3 | 0.3 |
| Water | Deionized water | Balance | Balance | Balance | Balance | Balance | Balance |
|  | Total (Percent by mass) | 100 | 100 | 100 | 100 | 100 | 100 |
| Properties | Dynamic surface tension at 15 ms (mN/m) | 36 | 31 | 31 | 31 | 26 | 31 |

TABLE 3

|  |  | Ink set 5 | | | |
|---|---|---|---|---|---|
|  |  | K2 | C2 | M2 | Y2 |
| Organic solvent | 1,3-butane diol |  | 23 | 23 | 23 |
|  | 1,5-pentane diol | 20 |  |  |  |
|  | Glycerin | 10 | 8 | 8 | 8 |
|  | 2-ethyl-1,3-hexanediol | 2 | 2 | 2 | 2 |
| Coloring material | Pigment dispersion 1 (solid mass) | 8 |  |  |  |
|  | Pigment dispersion 2 (solid mass) |  | 8 |  |  |
|  | Pigment dispersion 3 (solid mass) |  |  | 8 |  |
|  | Pigment dispersion 4 (solid mass) |  |  |  | 8 |

TABLE 3-continued

|  |  | Ink set 5 | | | |
| --- | --- | --- | --- | --- | --- |
|  |  | K2 | C2 | M2 | Y2 |
| Resin | Rosin-modified maleic acid resin Halimac R-100 (manufactured by Harima Chemicals, Inc.) | 2 | 2 | 2 | 2 |
| Surfactant | E1010 (manufactured by Nissin Chemical co., ltd.) | 1.0 | 1.5 | 1.5 | 1.5 |
| Defoaming agent | 2,4,7,9-tetramethyldecane-4,7-diol | 0.8 | 1.3 | 1.3 | 1.3 |
| Antibacterial agent | PROXEL LV | 0.2 | 0.2 | 0.2 | 0.2 |
| pH regulator | 2-amino-2-ethyl-1,3-propane diol | 0.3 | 0.3 | 0.3 | 0.3 |
| Water | Deionized water | Balance | Balance | Balance | Balance |
| Total (Percent by mass) |  | 100 | 100 | 100 | 100 |
| Properties | Dynamic surface tension at 15 ms (mN/m) | 36 | 30 | 30 | 30 |

Preparation Example 1 of Processing Fluid

Preparation of Processing Fluid 1

20.0 percent by mass glycerin, 2.0 percent by mass 1,3-butane diol, 1.0 percent by mass octane diol, 20.0 percent by mass magnesium sulfate heptahydrate (manufactured by Showa Chemical Industry Co., Ltd.), 0.5 percent by mass 2,4,7,9-tetramethyldecane-4,7-diol, 0.1 percent by mass polyoxyalkylene alkyl ether (EMULGEN 103, manufactured by Kao Corporation), 0.1 percent by mass Proxel LV (manufactured by Avecia Inkjet Limited), and 0.1 percent by mass benzotriazole were added and stirred for one hour and uniformly mixed. Furthermore, the remaining of deionized water was added to make the total 100 percent by mass followed by uniform mixing by stirring for one hour to obtain Processing fluid 1.

The dynamic surface tension of the obtained Processing fluid 1 was measured in the same manner as for the dynamic surface tension of the ink. The results are shown in Table 4.

Preparation Examples 2 to 4 of Processing Fluid

Preparation of Processing Fluid 2 to 4

Processing fluids 2 to 4 were obtained in the same manner as in Preparation Example 1 of Processing Fluid except that the processing fluid of Preparation Example 1 was changed to the compositions and the contents shown in Table 4. The values of the contents shown in Table 4 are represented in percent by mass.

The dynamic surface tension of the obtained processing fluids 2 to 4 was measured in the same manner as for the dynamic surface tension of the ink. The results are shown in Table 4.

TABLE 4

|  |  | Processing fluid 1 | Processing fluid 2 | Processing fluid 3 | Processing fluid 4 |
| --- | --- | --- | --- | --- | --- |
| Organic solvent | Glycerin | 20 | 20 | 20 | 20 |
|  | 1,3-butane diol | 2 | 2 | 2 | 2 |
|  | Octane diol | 1 | 2.5 | 1 | 1 |
| Flocculant | Magnesium sulfate heptahydrate (multivalent metal salt) | 20 | 20 |  |  |
|  | Calcium sulfate heptahydrate (multivalent metal salt) |  |  | 20 |  |
|  | Himax SC-506 (cationic polymer) |  |  |  | 20 |
| Surfactant | Polyoxyalkylene alkyl ether | 0.1 | 0.5 | 0.1 | 0.1 |
| Defoaming agent | 2,4,7,9-tetramethyldecane-4,7-diol | 0.5 | 1.2 | 0.5 | 0.5 |
| Antibacterial Agent | PROXEL LV | 0.1 | 0.1 | 0.1 | 0.1 |
| Corrosion Inhibitor | Benzotriazoles | 0.1 | 0.1 | 0.1 | 0.1 |
| Water | Deionized water | Balance | Balance | Balance | Balance |
| Total (Percent by mass) |  | 100 | 100 | 100 | 100 |
| Properties | Dynamic surface tension at 15 ms (mN/m) | 49 | 31 | 50 | 50 |

The details of each component in Table 4 are as follows:
Magnesium sulfate heptahydrate (manufactured by Showa Chemical Industry Co., Ltd.)
Calcium sulfate heptahydrate: manufactured by Showa Chemical Industry Co., LTD.
Polyoxyalkylene alkyl ether: EMULGEN 103, manufactured by Kao Corporation
Hi-Max SC-506: cationic polymer, manufactured by Himo Corporation Examples 1 to 12 and Comparative Examples 1 to 3

As shown in Table 5, the ink sets 1 to 5 and the processing fluids 1 to 4 were combined to form an image based on the image forming conditions shown in Table 6.

Specifically, using the image forming apparatus having the same configuration as illustrated in FIG. 1 equipped with the processing fluid application device illustrated in FIG. 2, the time taken for the ink discharged from the extreme downstream nozzle in the direction of recording medium conveyance to be heated after the ink is attached to a recording medium, which is, as illustrated in FIG. 1, the time between when the ink discharged from the extreme downstream nozzle in the head 111D in the direction of recording medium conveyance is attached to the recording medium 110 at the position X illustrated in FIG. 1 and when the recording medium 110 to which the ink is attached passes the position Y illustrated in FIG. 1 where the recording medium 110 contacts the heating roller 131, was controlled as shown in Table 6 and images with a resolution of 1,200 dpi×1,200 dpi were formed in the sequence shown in Table 6.

Next, image quality of each of the obtained image formed products were evaluated according to the following methods and evaluation criteria. The results are shown in Table 7.

Gamut Coverage

Using the image forming apparatus having the same configuration as illustrated in FIG. 1 equipped with the processing fluid application device illustrated in FIG. 2, a chart including a 10 or more stage patch of six or more hues of C, M, Y, R, G, and B with an area ratio of from 0 to 100 percent and an 8 or more stage patch in which K is added with an area ratio of from 0 to 100 percent to a 100 percent patch of C, M, Y, R, G, and B created by Microsoft Word 2000 (manufactured by Microsoft Corporation) was output on Lumiart gloss 130 gsm (LAG130, manufactured by Stora Enso AB) as a recording medium to measure L*a*b* color space using a spectral densitometer (X-Rite 939, manufactured by X-Rite Inc.).

Next, in a color gamut area formed by linking six points of C, M, Y, R, G, and B projected on the a*b* plane per lightness L*, the ratio (enclosed volume/color gamut volume of target color) of the value (enclosed volume) obtained by integrating the area in which the color gamut area and the color gamut area of a target color were overlapped to the color gamut volume of the target color, which was the gamut coverage, was obtained.

The gamut coverage is preferably 96 percent or more and more preferably 98.5 percent or more.

The color reproduction area in the L*a*b* color space defined by ISO-compliant Japan color sheet printing 2011 (abbreviation: Japan Color 2011 coated paper) was used as the target color.

Color Bleed

A solid image was printed on Lumiart gloss 130 gsm (LAG130, manufactured by STORA ENSO AB) as a recording medium using an image forming apparatus having the same configuration as that illustrated in FIG. 1 equipped with the processing fluid application device illustrated in FIG. 2 to visually observe color bleed to evaluate it according to the following evaluation criteria. Grade B or higher for color bleed is acceptable.

Bleeding at the boundary between adjacent inks of each color was evaluated as the color bleed. The monochrome ink set or the multiple color ink set was evaluated depending on whether individual colors or the entire color was focused.

Evaluation Criteria

A: None
B: Color bleed observed at a distance of 30 cm away
C: Color bleed observed at a distance of 1 m away
D: Color bleed observed at a distance of 1.5 m or more away L* Value of Black Dot Using an image forming apparatus having the same configuration as that illustrated in FIG. 1 equipped with the processing fluid application device illustrated in FIG. 2, a chart having a pattern of gray of 6.25 percent with a pattern color of black in a background of RGB color model at R:255, G:0, and B:0 created by Word 2000 (manufactured by Microsoft Corporation) was printed on Lumiart gloss 130 gsm (LAG130, manufactured by STORA ENSO AB) as a recording medium to measure the L* value of black dot of an image formed product using a microspectroscopic system (LVmicroZ, manufactured by Lambda Vision Inc.). The measurement mode was diffuse reflection and the light receiving spot was set to 400 μm. Black dot L* value of 22 or less is preferably acceptable.

TABLE 5

| | Composition of set of ink and processing fluid | | Dynamic surface tension | | | | |
|---|---|---|---|---|---|---|---|
| | Processing fluid No | Ink set No. | Γ (k) (mN/m) | Γ (c) (mN/m) | Γ (s) (mN/m) | γ(K)-γ(C) (mN/m) | γ(s)-γ(k) (mN/m) |
| Example 1 | Processing fluid 1 | Ink set 1 | 34 | 31 | 49 | 3 | 15 |
| Example 2 | Processing fluid 1 | Ink set 2 | 34 | 30 | 49 | 4 | 15 |
| Example 3 | Processing fluid 1 | Ink set 3 | 36 | 31 | 49 | 5 | 13 |
| Example 4 | Processing fluid 1 | Ink set 2 | 34 | 30 | 49 | 4 | 15 |
| Example 5 | Processing fluid 1 | Ink set 4 | 26 | 31 | 49 | −5 | 23 |
| Example 6 | Processing fluid 2 | Ink set 2 | 34 | 30 | 31 | 4 | −3 |
| Example 7 | Processing fluid 3 | Ink set 2 | 34 | 30 | 50 | 4 | 16 |
| Example 8 | Processing fluid 4 | Ink set 2 | 34 | 30 | 50 | 4 | 16 |
| Example 9 | Processing fluid 1 | Ink set 2 | 34 | 30 | 49 | 4 | 15 |
| Example 10 | Processing fluid 1 | Ink set 2 | 34 | 30 | 49 | 4 | 15 |
| Example 11 | Processing fluid 1 | Ink set 2 | 34 | 30 | 49 | 4 | 15 |
| Example 12 | Processing fluid 1 | Ink set 2 | 34 | 30 | 49 | 4 | 15 |
| Comparative Example 1 | Processing fluid 1 | Ink set 5 | 36 | 30 | 49 | 6 | 13 |

TABLE 5-continued

| | Composition of set of ink and processing fluid | | Dynamic surface tension | | | | |
|---|---|---|---|---|---|---|---|
| | Processing fluid No | Ink set No. | Γ (k) (mN/m) | Γ (c) (mN/m) | Γ (s) (mN/m) | γ(K)-γ(C) (mN/m) | γ(s)-γ(k) (mN/m) |
| Comparative Example 2 | Processing fluid 1 | Ink set 2 | 34 | 30 | 49 | 4 | 15 |
| Comparative Example 3 | Processing fluid 1 | Ink set 2 | 34 | 30 | 49 | 4 | 15 |

TABLE 6

| | Image forming condition | | |
|---|---|---|---|
| | Time taken for the ink discharged from the extreme downstream nozzle in the direction of recording medium conveyance to be heated after the ink is attached to a recording medium | Printing order | Application ratio of processing fluid to ink (mass ratio) |
| Example 1 | 1.5 seconds | Bk to CMY | 1:15 |
| Example 2 | 1.5 seconds | Bk to CMY | 1:15 |
| Example 3 | 1.5 seconds | Bk to CMY | 1:15 |
| Example 4 | 1.5 seconds | CMY to Bk | 1:15 |
| Example 5 | 1.5 seconds | Bk to CMY | 1:15 |
| Example 6 | 1.5 seconds | Bk to CMY | 1:15 |
| Example 7 | 1.5 seconds | Bk to CMY | 1:15 |
| Example 8 | 1.5 seconds | Bk to CMY | 1:15 |
| Example 9 | 1.5 seconds | Bk to CMY | 1:100 |
| Example 10 | 1.5 seconds | Bk to CMY | 1:5 |
| Example 11 | 1.0 seconds | Bk to CMY | 1:15 |
| Example 12 | 0.5 seconds | Bk to CMY | 1:15 |
| Comparative Example 1 | 1.5 seconds | Bk to CMY | 1:15 |
| Comparative Example 2 | 2.0 seconds | Bk to CMY | 1:15 |
| Comparative Example 3 | 30 seconds | Bk to CMY | 1:15 |

TABLE 7

| | Image quality | | |
|---|---|---|---|
| | Gamut coverage | Color bleed | L* value of black dot |
| Example 1 | 98.6 percent | A | 20 |
| Example 2 | 98.5 percent | A | 19 |
| Example 3 | 98.5 percent | A | 20 |
| Example 4 | 98.0 percent | B | 26 |
| Example 5 | 98.1 percent | B | 24 |
| Example 6 | 98.0 percent | A | 24 |
| Example 7 | 97.9 percent | B | 23 |
| Example 8 | 97.8 percent | B | 23 |
| Example 9 | 98.7 percent | B | 22 |
| Example 10 | 97.5 percent | A | 26 |
| Example 11 | 99.0 percent | A | 17 |
| Example 12 | 99.3 percent | A | 15 |
| Comparative Example 1 | 97.5 percent | C | 28 |
| Comparative Example 2 | 91.0 percent | C | 29 |
| Comparative Example 3 | 90.0 percent | D | 30 |

Aspects of the present disclosure are, for example, as follows.

1. An image forming method includes applying a processing fluid to a recording medium, applying an ink to the recording medium onto which the processing fluid has been applied, and heating the recording medium onto which the ink has been applied, wherein the ink contains a black ink and at least one color ink other than the black ink, wherein the following relationship is satisfied: |γ(k)-γ(c)|≤5 mN/m, where γ(k) represents a dynamic surface tension of the black ink at a surface lifetime of 15 ms and γ(c) represents a dynamic surface tension of the at least one color at a surface lifetime of 15 ms, wherein the ink discharged from an extreme downstream nozzle in the direction of recording medium conveyance is heated within 1.5 seconds of when the ink is attached to the recording medium.

2. The image forming method according to 1 mentioned above, wherein, in the applying an ink, the at least one color ink is applied to the recording medium after the black ink is applied thereto.

3. The image forming method according to 1 or 2 mentioned above, wherein the following relationship is satisfied: γ(k)>γ(c).

4. The image forming method according to any one of 1 to 3 mentioned above, wherein the following relationship is satisfied: |γ(s)-γ(k)|≤20 mN/m, where γ(s) represents a dynamic surface tension of the processing fluid at a surface lifetime of 15 ms.

5. The image forming method according to any one of 1 to 4 mentioned above, wherein the following relationship is satisfied: γ(s)>γ(k), where γ(s) represents a dynamic surface tension of the processing fluid at a surface lifetime of 15 ms.

6. The image forming method according to any one of 1 to 5 mentioned above, wherein the processing fluid contains a multivalent metal salt and/or a cationic polymer.

7. The printing method according to 6 mentioned above, wherein the multivalent metal salt is a magnesium salt.

8. The image forming method according to any one of 1 to 7 mentioned above, wherein the mass ratio of the processing fluid applied to the recording medium to the ink applied to the recording medium is from 1/5 to 1/100.

9. The image forming method according to any one of 1 to 8 mentioned above, wherein, for an image having a background represented by R:255, G:0, and B:0 in an RGB color model and a black pattern having a gray of 6.25 percent formed by the image forming method, black dots in the image have an L* value of 22 or less in the L*a*b color space.

10. The resin powder according to any one of 1 to 9 mentioned above, for solid freeform fabrication.

11. An image forming apparatus includes a processing fluid application device configured to apply a processing fluid to a recording medium, an ink application device including nozzles including an extreme downstream nozzle in the direction of recording medium conveyance, the ink application device being configured to apply an ink to the recording medium onto which the processing fluid has been applied, and a heating device configured to heat the recoding medium onto which the processing fluid has been applied, wherein the ink contains a black ink and at least one color ink other than the black ink, wherein the following relationship is satisfied: |γ(k)-γ(c)|≤5 mN/m, where γ(k) represents a dynamic surface tension of the black ink at a surface lifetime of 15 ms and γ(c) represents a dynamic surface tension of the at least one color ink at a surface lifetime of 15 ms, wherein the time taken for the recording medium onto which the ink has been applied to pass through the vicinity of the heating device or the position in contact with the heating device is 1.5 seconds or less after the ink discharged from the extreme downstream nozzle is applied to the recording medium.

12. The image forming apparatus according to 11 mentioned above, wherein, in the applying an ink, the at least one color ink is applied to the recording medium after the black ink is applied thereto.

13. The image forming apparatus according to 11 or 12 mentioned above, wherein the following relationship is satisfied: γ(k)>γ(c).

14. The image forming apparatus according to any one of 11 to 13 mentioned above, wherein the following relationship is satisfied: |γ(s)-γ(k)|≤20 mN/m, where γ(s) represents a dynamic surface tension of the processing fluid at a surface lifetime of 15 ms.

15. The image forming apparatus according to any one of 11 to 14 mentioned above, wherein the following relationship is satisfied: γ(s)>γ(k).

16. The image forming apparatus according to any one of 11 to 15 mentioned above, wherein the processing fluid contains a multivalent metal salt and/or a cationic polymer.

17. The image forming apparatus according to 16 mentioned above, wherein the multivalent metal salt is a magnesium salt.

18. The image forming apparatus according to any one of 11 to 17 mentioned above, wherein the mass ratio of the processing fluid applied to the recording medium to the ink applied to the recording medium is from 1/5 to 1/100.

19. The image forming apparatus according to any one of 11 to 18 mentioned above, wherein, for an image having a background represented by R:255, G:0, and B:0 in an RGB color model and a black pattern having a gray of 6.25 percent formed by the image forming method, black dots in the image have an L* value of 22 or less in the L*a*b color space.

20. The resin powder according to any one of 11 to 19 mentioned above, employing an inkjet method.

21. A set contains an ink containing a black ink and at least one color ink other than the black ink, and a processing fluid, wherein an image forming apparatus including a processing fluid application device configured to apply the processing fluid to a recording medium, an ink application device including nozzles including an extreme downstream nozzle in the direction of recording medium conveyance, the ink application device being configured to apply the ink to the recording medium onto which the processing fluid has been applied, and a heating device configured to heat the recoding medium onto which the processing fluid has been applied, wherein the time taken for the recording medium onto which the ink has been applied to pass through the vicinity of the heating device or the position in contact with the heating device is 1.5 seconds or less after the ink discharged from the extreme downstream nozzle is attached to the recording medium, wherein the following relationship is satisfied: |γ(k)-γ(c)|≤5 mN/m, where γ(k) represents a dynamic surface tension of the black ink at a surface lifetime of 15 ms and γ(c) represents a dynamic surface tension of the at least one color ink at a surface lifetime of 15 ms.

22. The set according to 21 mentioned above, wherein the following relationship is satisfied: γ(k)>γ(c).

23. The set according to 21 or 22 mentioned above, wherein the following relationship is satisfied: |γ(s)-γ(k)|≤20 mN/m, where γ(s) represents a dynamic surface tension of the processing fluid at a surface lifetime of 15 ms.

24. The set according to any one of 21 to 23 mentioned above, wherein the following relationship is satisfied: γ(s)>γ(k), where γ(s) represents a dynamic surface tension of the processing fluid at a surface lifetime of 15 ms.

25. The set according to any one of 21 to 24 mentioned above, wherein the processing fluid contains a multivalent metal salt and/or a cationic polymer.

26. The set according to 25 mentioned above, wherein the multivalent metal salt is a magnesium salt.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming method comprising:
applying a processing fluid to a recording medium;
applying an ink to the recording medium onto which the processing fluid has been applied; and
heating the recording medium onto which the ink has been applied;
wherein the ink comprises a black ink and at least one color ink other than the black ink,
wherein the following relationship is satisfied: |γ(k)-γ(c)|≤5 mN/m, where γ(k) represents a dynamic surface tension of the black ink at a surface lifetime of 15 ms and γ(c) represents a dynamic surface tension of the at least one color ink at a surface lifetime of 15 ms,
wherein the ink discharged from an extreme downstream nozzle in a direction of recording medium conveyance is heated at 1.5 seconds or less after the ink is attached to the recording medium.

2. The image forming method according to claim 1, wherein, in the applying the ink, the at least one color ink is applied to the recording medium after the black ink is applied thereto.

3. The image forming method according to claim 1, wherein the following relationship is satisfied: γ(k)>γ(c).

4. The image forming method according to claim 1, wherein the following relationship is satisfied: |γ(s)-γ(k)|≤20 mN/m, where γ(s) represents a dynamic surface tension of the processing fluid at a surface lifetime of 15 ms.

5. The image forming method according to claim 1, wherein the following relationship is satisfied: γ(s)>γ(k), where γ(s) represents a dynamic surface tension of the processing fluid at a surface lifetime of 15 ms.

6. The image forming method according to claim 1, wherein the processing fluid comprises at least one of a multivalent metal salt and a cationic polymer.

7. The image forming method according to claim 6, wherein the multivalent metal salt is a magnesium salt.

8. The image forming method according to claim 1, wherein a mass ratio of the processing fluid applied to the recording medium to the ink applied to the recording medium is from 1/5 to 1/100.

9. The image forming method according to claim 1, wherein an image having a background represented by R:255, G:0, and B:0 in an RGB color model and a black pattern having a gray of 6.25 percent formed by the image forming method includes black dots having an L*value of 22 or less in the L*a*b color space.

10. The image forming method according to claim 1, employing an inkjet method.

11. An image forming apparatus comprising:
a processing fluid application device configured to apply a processing fluid to a recording medium;
an ink application device including nozzles including an extreme downstream nozzle in a direction of recording medium conveyance, the ink application device being configured to apply an ink to the recording medium onto which the processing fluid has been applied; and
a heating device configured to heat the recording medium onto which the processing fluid has been applied,
wherein the ink comprises a black ink and at least one color ink other than the black ink,
wherein the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms,
wherein a time taken for the recording medium onto which the ink has been applied to pass through a vicinity of the heating device or a position in contact with the heating device is 1.5 seconds or less after the ink discharged from the extreme downstream nozzle is applied to the recording medium.

12. A set comprising:
an ink comprising a black ink and at least one color ink other than the black ink; and
a processing fluid,
wherein a time taken for the recording medium onto which the ink has been applied to pass through a vicinity of the heating device or a position in contact with the heating device is 1.5 seconds or less after the ink discharged from the extreme downstream nozzle is applied to the recording medium,
wherein the following relationship is satisfied: $|\gamma(k)-\gamma(c)| \leq 5$ mN/m, where $\gamma(k)$ represents a dynamic surface tension of the black ink at a surface lifetime of 15 ms and $\gamma(c)$ represents a dynamic surface tension of the at least one color ink at a surface lifetime of 15 ms.

13. The set according to claim 12, wherein the set is used in an image forming apparatus comprising a processing fluid application device configured to apply the processing fluid to a recording medium, an ink application device including nozzles including an extreme downstream nozzle in a direction of recording medium conveyance, the ink application device being configured to apply the ink to the recording medium onto which the processing fluid has been applied; and a heating device configured to heat the recording medium onto which the processing fluid has been applied.

14. The set according to claim 12, wherein the following relationship is satisfied: $\gamma(k) > \gamma(c)$.

15. The set according to claim 12, wherein the following relationship is satisfied: $|\gamma(s)-\gamma(k)| \leq 20$ mN/m, where $\gamma(s)$ represents a dynamic surface tension of the processing fluid at a surface lifetime of 15 ms.

16. The set according to claim 12, wherein the following relationship is satisfied: $\gamma(s) > \gamma(k)$, where $\gamma(s)$ represents a dynamic surface tension of the processing fluid at a surface lifetime of 15 ms.

17. The set according to claim 12, wherein the processing fluid comprises at least one of a multivalent metal salt and a cationic polymer.

18. The set according to claim 17, wherein the multivalent metal salt is a magnesium salt.

* * * * *